Figure 1:
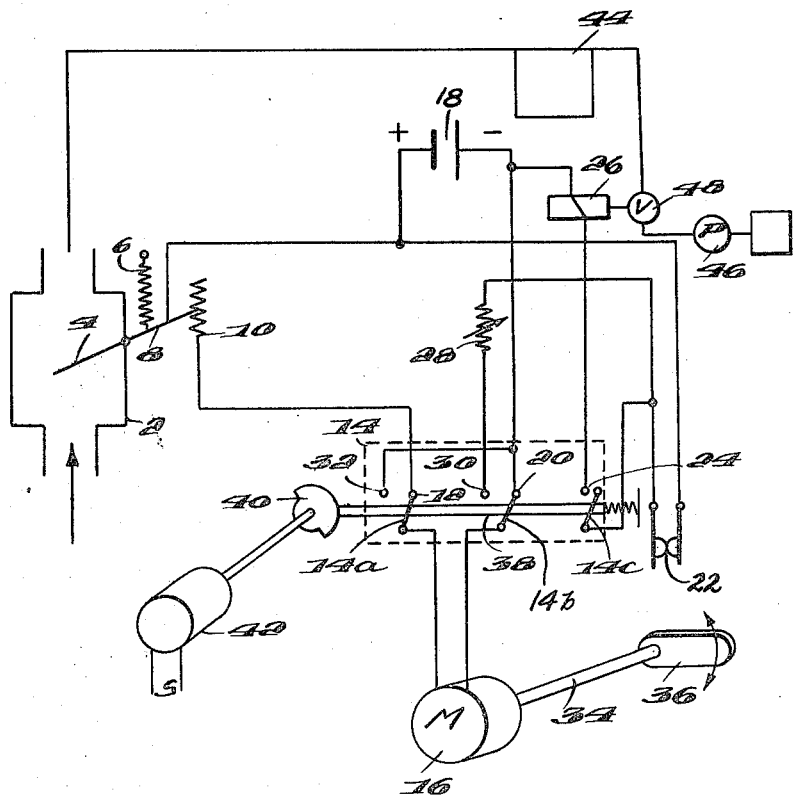

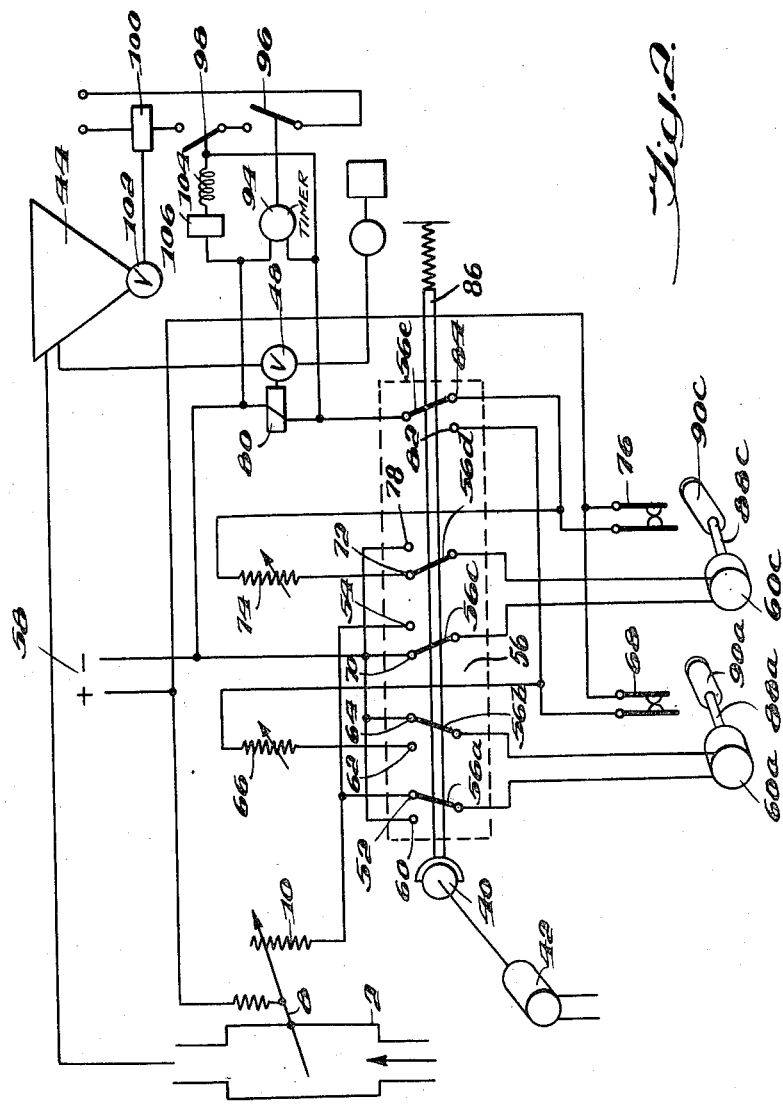

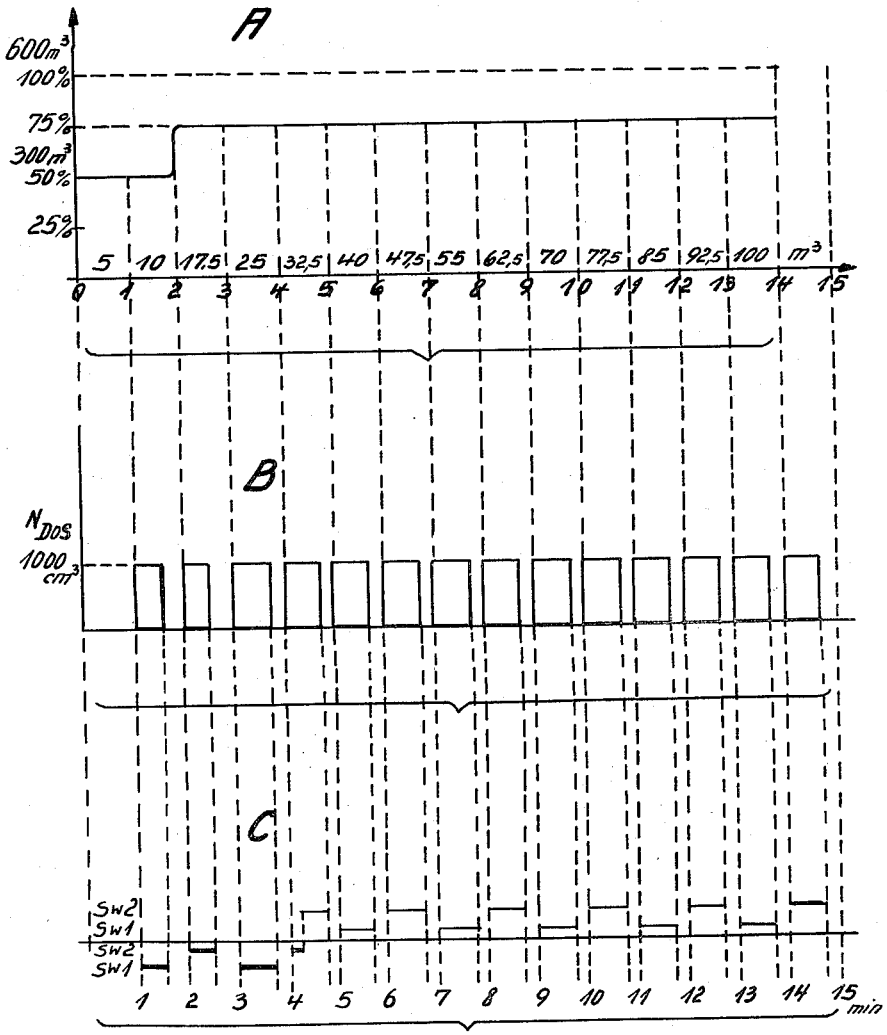

2,939,469

METHOD AND APPARATUS FOR FEEDING MATERIALS

Erhard Kämpf, Brahmsstrasse 10a, Berlin-Lichterfelde, and Alfred Kraft, Kronberg (Taunus), Germany Filed Jan. 27, 1958, Ser. No. 711,513

Claims priority, application Germany Jan. 25, 1957

17 Claims. (Cl. 137—3)

The invention relates to the feeding of materials to an area in which a continuous treatment is taking place, and particularly to a method and apparatus for such feeding. It is especially related to the feeding of chemicals in proportion to the feeding into and/or the withdrawal of other substances.

It is well known that, in order to carry out chemical reactions continuously, it is necessary to introduce the reacting materials in the proper quantitative proportions steadily into the reaction chamber and to remove the finished products from the reaction chamber according to the progress of the reaction. For this purpose, some of the reacting materials can be fed to or removed from the reaction chamber continuously, others intermittently, in particular periodically.

The adding of the different quantities of substances to a continuous process in suitable proportions is known as "dosing."

For the continuous treatment of fluids with solid, disintegrated substances, such as granulated or pulverized solids, it is known to effect the dosing by causing the fluid material to flow continuously into the reaction chamber, and to measure the quantity passing through the intake pipe continuously by an electrical measuring arrangement, a venturi tube or a similar known device. The measurements are transformed into control values for a dosing device, for instance a dosing screw conveyor with an adjustable rate of rotation which feeds the solid substances continuously into the reaction chamber proportionally to the quantity of the fluid.

In a similar manner, continuous feeding of several fluid reagents can be effected by causing one reagent to flow continuously into the reaction chamber, while the other reagents are added continuously into the reaction chamber proportionally to the flow measured in the inlet pipe of the first reagent, for instance by means of a dosing pump with an adjustable rate of rotation.

The continuous dosing of different quantities of gases to be added to variable flow of fluids or gases is possible in the same way, but the precision attainable is not satisfactory in most cases.

The quantities of reagents measured continuously by venturi tubes, electrical devices or the like are transformed proportionally into corresponding rotary movements of the dosing devices by means of an evolving mechanism, measure transformers and amplifiers so that a continuous feeding of the reagents in their proper quantitative proportions is obtained. These devices, however, require complicated electrical equipment which is susceptible to breakdown. Repairs can generally be made only by trained specialists, and the use of such equipment is economically impractical for many purposes.

A continuous dosing, which is, however, only approximately proportional, is possible by the use of a compensating regulator in connection with a remote-controlled variable speed transmission. The regulator, after short constant periods, determines the momentary value of the primary continuous feed component and transfers this value, for instance electrically, to control the variable speed transmission. This variable speed transmission is placed between the motor and the dosing device, and is controlled in such a way as to have the dosing correspond to the determined momentary value of the primary substance. Variations between the periodically determined values are not taken into account with this procedure, so that the dosing cannot be positively correctly proportional to quantity. Moreover, this arrangement is very expensive because it requires numerous parts, and because a remote controlled variable speed transmission must be provided for each motor unit. It is seldom economically feasible for the dosing of a number of reagents which may be, for instance, fluids and solid substances.

A dosing proportional to the quantity of the reagents in a continuous process is, however, possible in a much easier manner when the dosing of other reagents is effected intermittently each time after the passage of a definite quantity of one reagent which is fed continuously through a metering orifice. A preferred arrangement for this purpose uses a flow meter in connection with an emitter of control impulses.

In this connection, however, it must be considered that, if the quantity of the flow of the controlling reagent during a measuring period is very small, the corresponding control impulses for the other reagents to be added in constant quantities will come at correspondingly long intervals; as a result the proportions of the ingredients in the reaction chamber will be subject to considerable periodic variations. This, however, is undesirable for a continuous process.

On the other hand, in many cases the quantity of the mixture in the reaction chamber is large compared with the quantity of reagents added and of the reaction product removed during a measuring period. It is, therefore, possible to add periodically one or more reagents of short intervals without influencing essentially the proportions of the ingredients in the reaction chamber, since the mixture of the components in the chamber as well as the progress of the reaction itself takes a certain time.

The primary object of the present invention is to provide a dosing method which permits accurate maintenance of the proper proportions of ingredients within very narrow limits in the reaction chamber.

Another object of the invention is to provide such a method which is relatively easy and foolproof, and which can be carried out by comparatively simple and inexpensive apparatus.

A further object of the invention is to provide an apparatus for carrying out the method.

According to the invention, a method for dosing the reagents for a continuous reaction is to provide that one reagent, preferably that one of which the quantity is the largest, is continuously introduced into the reaction chamber while the quantity flowing in is measured integrately at fixed intervals, as for instance one minute, and to add into the reaction chamber after this interval one or more other reagents in a quantity proportional or equivalent to the quantity measured.

First the measured value of the quantity flowing during a predetermined short interval is transformed into a linear measurement, as a measurement of length or an angle. For this purpose, any integrating measuring instrument is suitable, for instance a flow meter. An arrangement especially suitable for remote control, and used preferably in the method which is the object of this invention, consists of a measuring diaphragm or a venturi tube in connection with a converting mechanism, a measuring transformer which converts the measured values into electric variations of voltage and current, and a measuring motor which starts from zero and runs at a speed proportional to these variations of voltage and current. The operating time of this measuring motor is the interval in which the flow quantity of the reagent introduced continuously into the reaction chamber is measured, for instance one minute. Then the motor is switched over from the flow meter to a constant source of current, in such a way that it returns to its zero-position at constant speed.

During this return period, dosing devices of predetermined conveying capacity per unit of time are switched in by means or relays so that they deliver quantities of reagents which are directly proportional to the period required for the motor to return to its zero position.

The return period is dependent on the constant speed of the returning motor as it returns and the distance through which it operates. This distance is, however, determined by the length or angle measurement, for instance the number of revolutions, which is proportional to the continuously measured flow quantity of the reagent which is being steadily introduced during the time interval.

The conveying capacity of the periodically actuated dosing devices is suitably adjusted to an amount which represents the maximum of reagents which may be needed during the measuring interval. Moreover, the return speed of the measuring motor is preferably somewhat higher than the maximum advancing speed based on the quantity of flow of the main reagent to be expected during an interval in which the first reagent flows constantly, so as to ensure the time necessary for switching the measuring motor from one operation to the other. The switching over of the measuring motor from one operation to the next at constant intervals is effected by a time switch such as is usual for this purpose.

For certain cases, especially when only small short variations of the quantity of flow occur, that is, with almost constant flow quantities of the continuously introduced component per interval of time, it may be sufficient to measure the flow integrately during short intervals, for instance one minute, and, after the switching over, in the following minute to measure in the dosing devices the reagents for the requirements of, for instance, two minutes. In this case, of course, the total reagent flowing continuously during the dosing time cannot control precisely the quantity-proportional regulation of the other reagents. This is, however, without importance as long as the continuously introduced component can be expected to flow in an approximately constant manner.

An important application of the dosing method which is the object of this invention is the treatment of fresh and waste water. In such procedures, however, short variations in the flow quantity of the untreated water can be often expected. In spite of this fact, the quality of the clarified water must never vary. It is, therefore, imperative that at no time shall untreated water enter the clarifying chamber without the exact amount of the necessary clarifying chemicals being added.

The preferred arrangement for the dosing method which is the object of this invention provides, therefore, two measuring motors which are switched over alternately to the two partial operations, that is, the integrating measurement and the control of the dosing devices.

While one of the two motors is measuring integrately the quantity of the component which flows continuously into the reaction chamber during the constant intervals, the other motor is determining the operating time of the dosing device according to the flow quantity measured during the preceding interval. All reagents are therefore added in exactly proportional or equivalent quantities into the reaction chamber, and the components dosed according to the flow quantity of the continuously flowing reagent are introduced into the reaction chamber one interval out of phase.

By placing the point at which the controlling reagent is measured at an appropriate distance from the reaction chamber, further away than the dosing devices, it can be easily assured that the dosed components are introduced into the reaction chamber at the same time as the continuously fed component.

Further objects and advantages of the invention will appear more fully from the following description, especially when taken in conjunction with the accompanying drawings which form a part thereof.

In the drawings:

Figs. 1 and 2 show diagrammatically two forms of apparatus for carrying out the invention; and Fig. 3 is an explanatory chart.

In the form of Fig. 1, the main component flows through a pipe 2, in which is arranged a pivoted vane 4 in the path of the material. This vane is urged against the current flow by spring 6. An arm 8 moves over a potentiometer resistance 10. One end of resistance 10 is connected to terminal 12 of reversing switch 14, whose blade 14a is connected to a measuring motor 16. Arm 8 is connected through battery 18 to terminal 20 of switch 14, whose blade 14b is connected to the other terminal of motor 16.

Battery 18 is connected to contacts 22, which, in turn, are connected (a) To blade 14c of switch 14, the terminal 24 of which is connected through relay 26 to the other terminal of the battery; and (b) Through adjustable resistance 28 to terminal 30 engageable by blade 14b.

Terminal 32 engageable by blade 14a is also connected to the second terminal of the battery.

Motor 16 drives a shaft 34 which carries at its end a lever 36 engageable with contacts 22. Control rod 38 of switch 14 is shifted periodically in one direction and the other by a cam 40 driven by a constant speed motor 42.

Passage 2 leads to a reaction chamber 44, to which reagents may also be fed by a pump 46 through valve 48 controlled by relay 26.

In Fig. 1, the measuring motor 16 is shown in the position where it measures the flow quantity of the controlling reagent.

The variations of the flow quantity during the time interval produce corresponding changes in the position of the wiper 8 of the potentiometer 10, which transforms the variations of quantity into variations of voltage, controlling proportionally the speed of the measuring motor 16. This relation is expressed by the following Equation 1:

(1) $$dw = c \cdot du$$

In this equation, the values are $dw$ the momentary value of the motor speed
$du$ the corresponding momentary value of the electric voltage
$c$ a motor constant During a constant time interval $t_1 - t_0$ all the speeds corresponding to the different voltage values $du$ are added to give an operating distance $s$. This is an integrating operation expressed by the equation $$s = \int_{t_0}^{t_1} dw \cdot dt$$

The time interval $t_1 - t_0$ is determined by the time switch 40, 42 and is fixed, for instance, at one minute. The distance $s$ is the length of the circular travel performed by the lever 36 away from the interruptor contacts 22 during this period, and this distance varies proportionally to the quantity of reagent which has passed through pipe 2 during this interval, and thus represents the value of the ratio of the amount of the first material fed during one minute to the maximum possible feed in one minute. The reversing switch 14 is composed of a double pole flip-over switch with the contact blades 14a and 14b and the single interruptor switch with contact blade 14c.

At the end of the time interval $t_1-t_0$, the timer 40, 42 switches the contact blades 14a, 14b from the contacts 12 and 20 in the regulating potentiometer circuit to the contacts 32 and 30 which connect the measuring motor 16 directly to the source of current 18 with reversed poles. At the same time, contact blade 14c is connected to contact 24 so that the relay 26 is energized to open valve 48.

After the switching over, the motor 16 therefore returns with constant voltage and correspondingly with constant speed from the point reached during the former operation, until the lever 36 reaches the interruptor contact 22 and breaks the circuit. This stops the motor itself by interrupting the electric circuit 18, 22, 28, 30, 16, 32, 18. Moreover, the current to the relay 26 of the dosing devices is cut off by interruption of the electric circuit 18, 26, 24, 22, 18. Thus the dosing device (relay 26 and valve 48) will have been in operation during a period which is proportional to the flow quantity through the measuring arrangement during the time interval $t_1-t_0$, or to the ratio between such flow quantity and the maximum possible flow quantity.

The measuring motor 16 now stands in its initial position, ready for the registration of a further measuring value of the flow quantity through the measuring device during a further time interval $t_1-t_0$. This registration begins as soon as the time switch 40, 42 moves the contact levers 14a and 14b back to the contacts 12 and 20 and lifts the contact lever 14c from the contact 24. During this time, the control relay 26 for the dosing device is without current and the measuring motor runs again in its advance movement in a clockwise direction until the end of the time interval $t_1-t_0$.

By variation of the resistance 28, the return speed of the measuring motor is set to a value sufficient to assure that the return operation, even for long return distances, is almost equal to, and preferably somewhat shorter than, the time interval determined by the time switch 40, 42, in order to obtain the time lag necessary to effect the switching operations.

Obviously, where several reagents are to be controlled, the use of a plurality of relays, or of several values controlled by a single relay, would be necessary.

As has been mentioned above, the arrangement with only one motor according to Fig. 1 is suitable for continuous processes in which the flow quantity of the continuously introduced component per time interval is not subject to substantial changes.

The control device which is the object of this invention automatically takes into account flow variations of the main component which last for a considerable period, and offers moreover the advantage of simplifying a desired change in the flow capacity, in that only the flow quantity of the continuously fed component per time interval needs to be changed while the dosing of the other components is regulated automatically.

In addition to the control of the dosing device, the arrangement which is the object of this invention is able to control also a device for the removal of the reaction products from the reaction chamber so that the reaction products are removed in the desired proportionality to the supply of the reagents.

Fig. 2 shows the diagram of an arrangement with two measuring motors.

In this modification, flow in passage 2 controls potentiometer 10, as in Fig. 1. One end of this potentiometer is connected to contacts 52, 54 of multiple switch 56. Arm 8 is connected to one terminal of a power source 58. Measuring motors 60a, 60c have their terminals connected to blades 56a, 56b and 56c, 56d of switch 56. Blade 56a can engage contact 52, as well as contact 60 which is connected to one terminal of the current source. Blade 56b can engage contact 64 connected to power source 58 or contact 62 connected through adjustable resistance 66 and contacts 68 to the other terminal of the current source. Blade 56c can engage contact 54 or contact 70 which is connected to the power source. Blade 56d can engage contact 72 connected through variable resistance 74 and contacts 76 to the power source, or contact 78 connected to the other terminal of the source.

Blade 56e is connected through relay 80 to one terminal of the power source. Contacts 82 and 84 engageable by this blade are connected through contacts 68, 76 to the other terminal.

The operating rod 86 of switch 56 is operated by cam 40 and motor 42. Relay 80 controls valve 48 in the line to reaction chamber 44. Motors 60a, 60c through shafts 88a, 88c turn levers 90a, 90c engageable with contacts 68, 76 for opening these contacts.

By means of the two double-pole change-over switches 56, the two measuring motors are connected alternately with reversal of their poles to the electric circuit of the measuring potentiometer 10 and the source 58. The single-pole change-over switch 56e connects the valve control relay 80 alternately to the interrupter contacts 68 and 76, respectively, thus connecting their measuring motors to the relay circuit.

In the arrangement according to Fig. 2, the measuring motor 60a is connected to the electric circuit of the potentiometer 10 and starts from its initial position determined by the lever and the interrupter contact 68 to turn, for instance, in a clockwise direction. During this advance motion, the speed varies proportionally according to the voltage values given by the potentiometer. At the end of the time interval determined by the time switch, the angular distance of the lever 90a from the interrupter contact 68 is the measure of the quantity which has passed through the flow meter during this time interval and serves to determine the operation time of the dosing device and the relay circuit. While the measuring motor 60a is measuring the flow quantity during a given time interval, the measuring motor 60c is returning from the position reached during the preceding time interval to its initial position, for instance in counterclockwise direction, so that the lever 90c opens the interrupter contacts 76. During this return operation the relay 80 opens the valve 48, and, if desired, a removal valve 102 in the reaction chamber.

As in the arrangement according to Fig. 1, the return speed of the measuring motors is constant and, by means of the resistances 66, 74, is adjusted so that the levers 90a, 90c reach their initial positions before the end of the control period even in the case of long return distances.

The following is an example of a procedure according to the invention.

*Example*

As an example, the application of the method which forms the object of this invention will be explained in connection with a continuous clarifying process for surface water to which calcium hydroxide and ferric chloride are added.

In the clarifying process, 100 grams of calcium hydroxide and 10 grams of ferric chloride are to be added to every cubic metre of surface water. The calcium hydroxide in dry, pulverized state is measured by a dosing scale while the ferric chloride is measured by means of a dosing pump and is used in a 10%-water solution.

With a plant having a maximum capacity of 600 cubic metres per hour, the dosing consists per minute for 10 cubic metres of untreated water of 1000 grams of calcium hydroxide and 1 litre of a 10% $FeCl_3$ solution.

In the untreated water-feeding pipe 2, a measuring device is installed which is set to a maximum pressure corresponding to a 3000 millimetre column of water. The measuring instrument gives an output which responds to the flow quantity on a linear manner. The variable potentiometer 10 transforms variations of speed of flow into variations of voltage. 120 ma. at the connections of the measuring motor in the potentiometer circuit correspond with the constant resistances planned to the maximum flow speed of 600 cubic metres per hour in the feeding pipe. With this current, the measuring motor advances 300° in the clockwise direction from its initial position during the time interval of 1 minute determined by the time switch. With a current of 60 ma. only, the rotation would be only 150°.

At the end of the time interval of 1 minute, the measuring motor 60a is switched over from the potentiometer circuit to the relay circuit. In this, a constant current of 120 ma. is connected to the motor terminals, but, with pole reversal. The measuring motor 60a runs backward therefore for one minute until, upon reaching its end position, it opens the interrupter contacts 68 by means of the lever 90a, stops itself and interrupts at the same time the circuit of relay 80. During the reverse movement of the measuring motor 60a, the relay 80 is closed so that the valve 48 is open and delivers the planned constant quantities of substances which, in the present case, are fixed to the required maximum quantities of 1 kilogram of calcium hydroxide per minute and 1 litre of $FeCl_3$ solution per minute, respectively. When the interrupter contacts 68 open, the dosing is stopped.

If the measuring motor 60a in the potentiometer circuit has not reached its maximum end position of 300°, because of a smaller flow speed through the measuring device, the return operation of the motor in the relay circuit is terminated earlier so that correspondingly the opening time of the valve is shortened and the quantities of substances delivered are reduced proportionally. For the rest of the interval the measuring motor and the valve are motionless until, at the beginning of a new interval, the measuring motor is again set into advance motion while the valve is opened during the return travel of the second measuring motor 60c. Motor 60c goes through the same cycle, out of phase with motor 60a.

When clarifying water chemically by the addition of a precipitation and/or a flocculation medium, or biologically in the presence of active sludge or similar substances, the solid reaction products formed need a certain deposition time for settling from a thin suspension to a more concentrated silt in the collector, which is generally conical.

A continuous removal of the sludge is often impossible because the solidified substances need a sufficient time for deposition. An intermittent periodical drainage of the sludge can be obtained by coupling it with the control of the dosing devices adding the chemicals, in which case the sludge draining devices are operated at the same control frequency as the dosing devices. Preferably the sludge drainage is, however, operated at even longer intervals in order to extend the settling time in the collector and to allow for the removal of greater quantities of sludge. This makes it possible to use draining pipes and valves of larger diameter, thus lessening considerably the risk of clogging.

Moreover, with a pulsating drainage of larger quantities of sludge, the sludge in a conical collector is drawn to the mouth of the cone and the sludge settled along the walls is caused to slide in the same direction.

In order to be able to correlate the sludge drainage with the control of the dosing devices during extended drainage intervals, and in order to maintain the proper proportionality between the water passing into the chamber and the chemicals added, this invention provides for a control of the sludge drainage by a timing mechanism with an adjustable cycle of, for instance, ten minutes and with a switch which closes during an adjustable rotation period of, for instance, two minutes and operates one or more sludge draining devices. This timing mechanism is actuated by the relay 80 which also opens and closes the dosing valve.

In Fig. 2, the timing apparatus is designated as 94. It closes the switch 96 for a control interval which is adjustable by proper setting of the timer. In its closed position, switch 96, assuming switch 98, to be described below, to be closed, energizes relay 100 to open sludge discharge valve 102. The flow capacity of the valve 102 is substantially determined by its diameter and its period of opening.

When the water-clarifying plant runs on full load, the dosing valve is continuously open and consequently the timing mechanism 94 is also in continuous motion.

The short switching intervals occurring in the two electric circuits when the measuring motors are alternated as described above can be left out of consideration.

When the water-clarifying plant is run on half load, the dosing devices and also the timing mechanism for the sludge drainage are only temporarily in action during each control interval.

The timing mechanism 94 sums up the dosing times of the different control intervals, and when the total is equal to the set switching cycle of the timing mechanism, the drainage valve 102 is opened for the control interval set at the time switch 94.

This relation, which can be adapted at will to the quantity of the untreated water, the requirements for chemicals, the peculiarities of the sludge, and the like, remains constant with all temporary variations in the flow of the untreated water. The desired quantity-proportionality between the sludge drainage and the quantity of untreated water, and the time intervals depending on the consistency of the sludge, are in this way complied with.

With very small flow of untreated water, the sludge drainage, which is determined substantially by the quantity to be drained and the opening time of the drainage device, can be extended over a number of dosing intervals so that the concentration of solid substances in the collector is kept more uniform while the average settling time is extended.

Fig. 3 shows in the form of a diagram the control operations performed in the water-clarifying plant in the course of, for instance, fifteen minutes.

This diagram consists of three parts A, B, C, which have in common as abscissa a time scale graduated into minutes. The ordinates in part A represent the quantity of untreated water introduced, the full load of 600 cubic meters per hour being put as 100%. The ordinates in part B show the rated output of one of the dosing devices, in this case, for instance the ferric chloride dosing device. The variable dosing quantities, dependent on the untreated water flow are represented as blocks of constant length but of varying width. Part C shows only a horizontal time scale above which are marked the operation times of the dosing devices operated by the measuring motors 60a and 60c. The upper lines apply to the motor 60c, the lower lines to the motor 60a.

The thicker lines under the time scale show the operating times of the dosing devices, during which the drainage device is simultaneously in operation. Here too the upper lines apply to the measuring motor 60c and the lower lines to motor 60a.

From this diagram, the following can be seen: part A shows that during each of the first two minutes of the operating period under consideration, five cubic meters of untreated water flow into the plant, that is half the maximum load. During the third and all following minutes, seven and one-half cubic meters are fed, that is, 75% of the maximum load, and after fourteen minutes a total of one hundred cubic meters of untreated water have been introduced.

The adaptation of the quantities of the dosed chemicals to the water flow is shown in part B. For the quantity of untreated water fed during the first minute of the operating period under consideration, the proportional quantities of reagents, of which only one component is shown, are added during the second minute. At the beginning of the second minute the dosing devices are set into motion for thirty seconds, corresponding to the fact that the flow quantity attained only 50% of the maximum load. The same is repeated in the third minute for the quantity of untreated water measured during the second minute. During the fourth minute, the dosing devices are operated for forty-five seconds, since the flow quantity during the third minute had increased to 75% of the maximum load, or seven and one-half cubic meters per minute. During each of the following minutes, the dosing devices are in operation for forty-five seconds.

During the first fourteen minutes of the operating period under consideration, one hundred cubic meters of untreated water are fed into the plant. This is the quantity after the passage of which it has been decided that the sludge drainage is to be effected. In part C of the diagram, this operation is placed at the beginning of the time scale and refers to the one hundred cubic meters of untreated water fed to the plant during the preceding operating period.

Simultaneously with the starting of the dosing devices in the second minute of the operating period under consideration, the sludge drainage device is set into motion and runs for thirty seconds, that is, for the same time as the dosing devices. During the third minute, the drainage device is run for another thirty seconds. Since, however, in this minute the flow of untreated water increases to seven and one-half cubic metres, or 75% of the maximum load, the dosing devices are put into operation for forty-five seconds during the fourth minute, and the sludge drainage valve is opened for the same length of time. At the beginning of the fifth minute the drainage device has been opened for one minute and forty-five seconds. The measuring motor 60c now starts again both the dosing and the drainage devices. While the former are operated for forty-five seconds, the timing mechanism 94, 106, which is connected in parallel to the relay 80, interrupts the circuit of the drainage device after fifteen seconds, since the sludge drainage time has been reached which was set as two minutes for each one hundred cubic metres of untreated water. For the rest of the period, the timing mechanism 94 advances with the dosing devices, without however operating the drainage valves by the switch 96 since switch 98 is open. It sums up, however, the operation times of the dosing devices during the different control intervals, and thus performs a total cycle when one hundred metres of untreated water have passed through the measuring mechanism of the feeder pipe. With an analogous continuation of the diagram, the measuring motor 60a will operate, in the sixteenth minute, the dosing devices and the timing mechanism for forty-five seconds and the latter will switch in the sludge drainage device for the same duration. With an unchanged flow of untreated water of seven and one-half cubic metres per minute, the same switching operation is performed again by the measuring motor 60c.

In the eighteenth minute, the dosing devices and the timing mechanism 94, 106 are again set into operation by the measuring motor for forty-five seconds, but the latter interrupts the drainage operation after thirty seconds as the planned operation time of two minutes for the drainage is reached.

Thus the sludge drainage is coupled by the timing mechanism 94, 106 and the relay 80 to the control system consisting of the measuring motors 60a and 60c as well as the timer 40, 42, and this control system transforms the flow quantities measured through the measuring device of the feeder pipe 2, first into proportional length or angular measures and these again into proportional timing periods. Consequently for a definite quantity of untreated water a proportional quantity of sludge is drained. With a reduced flow quantity of water, the amount of sludge is also smaller and the necessary settling time longer. This regulation of the sludge drainage in dependence on the supply of water thus assures substantially uniform conditions of sedimentation.

When only small temporary variations in the supply of untreated water are to be expected, for instance, when the water is taken from a larger reserve, it will be sufficient to cause the timing mechanism 96 to give for each cycle a control impulse to the time switch 96 set to the drainage period so that this time switch opens the drainage device for the necessary period, in this case for two minutes.

The method which forms the object of this invention, for the proportional dosing of reagents in a continuous process, is suitable for the dosing of substances in the forms of solids, fluids and gases. The adaptation of the dosing devices to the different physical forms of the substances to be dosed is rendered particularly easy since, for this purpose, usual feeding devices can be employed which are adjustable to different but always constant feed quantities.

While in the drawings we have shown only a single dosing device controlled by the circuits, it is clear that any desired number of such devices may be provided. Likewise, while we have shown a valve as the dosing device, it is apparent that other types of dosing devices can readily be substituted therefor.

It will be apparent that, in the form of Fig. 1, the dosing devices, under the same conditions, must feed twice as fast as those of Fig. 2, since they operate only during one-half of the time intervals while the main reagent is fed continuously. In other words, the ratio between the feed of the dosing devices and the main feed must, under the broadest aspects of the invention, take into account the fraction of the total time intervals during which such dosing devices operate.

The expression "a constant rate which is in predetermined proportion to the maximum feed of the first material during any time interval divided by the fraction of the time intervals during which the second material is fed" refers to the fact that it is not necessary to feed the second material during each time interval, but such feeding may take place only during alternate time intervals or the like. For example, if it desired to apply $x$ ounces of added material to each 100 gallons of the first material, which is flowing with the maximum flow of 100 gallons a minute, the device for feeding the second material must be capable of feeding $2x$ ounces a minute, that is $x$ ounces divided by the fraction of the time intervals during which the second material is fed, or $x$ divided by ½ which is $2x$. This $2x$ ounces per minute is then adjusted so that, for example, for a flow of the first material of 60 gallons per minute, the feed of the second material will be $1.2x$ ounces.

While we have described herein some embodiments of our invention, we wish it to be understood that we do not intend to limit ourselves thereby except within the scope of the claims hereto or hereinafter appended.

We claim:

1. Method of feeding materials into a continuous process in predetermined proportions, which comprises feeding a first of the materials continuously during a plurality of successive time intervals, measuring the amount of such first material fed during each given time interval, and during the time interval succeeding such given time interval feeding a quantity of a second material in a predetermined proportion with respect to the quantity of the first material fed during said preceding given time interval.

2. Method of feeding materials into a continuous process in predetermined proportions, which comprises feeding a first of the materials continuously during a plurality of successive time intervals, measuring the ratio of the amount of such first material fed during each given time interval to the maximum possible feed during such interval, feeding during the time interval succeeding such given time interval at least a second material at a constant rate which is in predetermined proportion to the maximum feed of the first material during any time interval, and maintaining the ratio of the time of feeding of the second material during such succeeding time interval to the whole period of time equal to the ratio between the feed of the first material during said preceding given time interval and said maximum feed.

3. Method as claimed in claim 2, in which the feed quantity of the first material is greater than that of the second material.

4. Method as claimed in claim 2, in which each time interval is of the order of one minute.

5. Method as claimed in claim 2 in which the period of feeding of the second material is equal to the time interval.

6. Method as claimed in claim 2 in which the period of feeding of the second material is less than the time interval.

7. Method of feeding materials into a continuous process in predetermined proportions, which comprises feeding a first of the materials continuously during a plurality of successive time intervals, measuring the ratio of the amount of such first material fed during a given time interval to the maximum possible feed during such interval, feeding at least a second material at a constant rate which is in predetermined proportion to the maximum feed of the first material during any time interval divided by the fraction of the time intervals during which the second material is fed, and maintaining the ratio of the time of feeding of the second material during the time interval succeeding such given time interval to the whole period of time equal to the ratio between the feed of the first material during said preceding given time interval and said maximum feed.

8. Method as claimed in claim 7, in which the feed quantity of the first material is greater than that of the second material.

9. Method as claimed in claim 7 in which the period of feeding of the second material is less than the time interval.

10. Method as claimed in claim 7 in which said fraction is one-half.

11. Apparatus for feeding materials in proper proportions to a continuous chemical process, which comprises means to feed a first material continuously to the process during a plurality of successive time intervals, means to measure the amount of said first material fed during a given interval of time, means to determine the ratio between such amounts and the maximum amount which can be fed during such interval, means to feed at least a second material to said process at a constant rate which is in predetermined proportion to the maximum feed of the first material during any time interval divided by the fraction of the time intervals during which the second material is fed, and means controlled by said ratio determining means to maintain during the time interval succeeding such given time interval the ratio of the time of operation of said means for the feeding of the second material during such succeeding time interval to the whole period of time equal to the ratio between the feed of the first material during said preceding given time interval and said maximum feed.

12. Apparatus as claimed in claim 11, in which the feeding means for the first material has a greater capacity than that for the second material.

13. Apparatus as claimed in claim 11 in which said fraction is one-half.

14. Apparatus for feeding materials in proper proportions to a continuous chemical process, which comprises means to feed a first material continuously to the process during a plurality of successive time intervals, means to measure the amount of said first material fed during a given interval of time, means to determine the ratio between such amounts and the maximum amount which can be fed during such interval, a measuring motor, means responsive to said ratio determining means to drive said motor in one direction through a distance from a predetermined position proportional to said ratio, time-controlled means to reverse said motor at the end of such interval to run in the reverse direction at constant speed, means to feed at least a second material to said process, at a constant rate which is in predetermined proportion to the maximum feed of the first material during any time interval divided by the fraction of the time intervals during which the second material is fed, means controlled by said time controlled means to connect said second material feeding means to said source to start the operation thereof when said motor is reversed, and means controlled by the return of said motor to said predetermined position to disconnect said second material feeding means from said source to stop the operation thereof.

15. Apparatus for feeding materials in proper proportions to a continuous chemical process, which comprises means to feed a first material continuously to the process during a plurality of successive time intervals, a potentiometer, means to adjust said potentiometer in proportion to the quantity of material being fed by said first material feeding means, a source of current and a measuring motor connected in circuit with said potentiometer, means to feed at least a second material to said process at a constant rate which is in predetermined proportion to the maximum feed of the first material during any time interval divided by the fraction of the time intervals during which the second material is fed, time-controlled switch means for maintaining the motor in circuit with the potentiometer and source during a time interval, during which the motor moves away from a predetermined position, and for connecting said motor directly to said current source with reversed poles at the end of such time interval and for simultaneously connecting said second material feeding means to said source to start operation thereof, and means controlled by return of said motor to said predetermined position to disconnect said second material feeding means from said source of current so as to interrupt the operation thereof.

16. Apparatus for feeding materials in proper proportions to a continuous chemical process, which comprises means to feed a first material continuously to the process during a plurality of successive time intervals, a potentiometer, means to adjust said potentiometer in proportion to the quantity of material being fed by said first material feeding means, a source of current, two measuring motors, means for feeding at least a second material to said process at a constant rate which is in predetermined proportion to the maximum feed of the first material during any time interval, time-controlled switch means for alternately, at the end of each time interval, connecting said motors to the potentiometer and source, so that during such time interval one of the motors moves from a predetermined position by a distance proportional to the quantity of first material fed during such interval, and for connecting said motor directly to said source with reversed poles, so that during the next time interval the motor returns at constant speed to said predetermined position, said switch means further including means operable at the beginning of the next time interval to connect said second material feeding means to the source to start operation thereof, and means controlled by the return of the motor to said predetermined position during such next time interval to disconnect said second material feeding means from the source to stop the operation thereof.

17. In a device as claimed in claim 16, means to withdraw material from the process, means controlled by said second material feeding means to integrate the amount of said first material fed during a cycle composed of a substantial number of time intervals, a circuit connecting said withdrawing means and a source of current, a first switch in said last circuit, means to close said first switch when said feeding means are in operation, a second switch in said circuit, and means controlled by said integrating means to close said second switch during the first part of the cycle for a period during which both switches are simultaneously closed for a time proportional to the amount of the first material fed during the preceding cycle.

No references cited.